US010711640B2

(12) United States Patent
Ortiz et al.

(10) Patent No.: US 10,711,640 B2
(45) Date of Patent: Jul. 14, 2020

(54) COOLED COOLING AIR TO BLADE OUTER AIR SEAL PASSING THROUGH A STATIC VANE

(71) Applicant: UNITED TECHNOLOGIES CORPORATION, Farmington, CT (US)

(72) Inventors: Jonathan Ortiz, El Centro, CA (US); Lane Mikal Thornton, Tolland, CT (US); Matthew A. Devore, Rocky Hill, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 239 days.

(21) Appl. No.: 15/484,168

(22) Filed: Apr. 11, 2017

(65) Prior Publication Data

US 2018/0291762 A1 Oct. 11, 2018

(51) Int. Cl.
*F01D 17/16* (2006.01)
*F01D 25/12* (2006.01)
(Continued)

(52) U.S. Cl.
CPC ............. *F01D 25/12* (2013.01); *F01D 5/081* (2013.01); *F01D 9/041* (2013.01); *F01D 9/065* (2013.01);
(Continued)

(58) Field of Classification Search
CPC ................................. F02C 9/18; F01D 17/162
See application file for complete search history.

(56) References Cited

U.S. PATENT DOCUMENTS 2,692,476 A 10/1954 Schaal et al.
3,878,677 A 4/1975 Colvin
(Continued)

FOREIGN PATENT DOCUMENTS

DE 2852057 6/1979
EP 0447886 9/1991
(Continued)

OTHER PUBLICATIONS

Dornheim, Michael A., Rolls-Royce Trent 1000 to Drive Boeing 787 Accessories From IP Spool, Aviation Week & Space Technology, Mar. 28, 2005, p. 51, Los Angeles, CA.
(Continued)

*Primary Examiner* — Gerald L Sung
*Assistant Examiner* — Alyson Joan Harrington
(74) *Attorney, Agent, or Firm* — Carlson, Gaskey & Olds, P.C.

(57) ABSTRACT

A gas turbine engine comprises a compressor section, a combustor, and a turbine section. The turbine section includes a high pressure turbine first stage blade having an outer tip, and a blade outer air seal positioned radially outwardly of the outer tip. A tap taps air having been compressed by the compressor, the tapped air being passed through a heat exchanger. A vane section has vanes downstream of the combustor, but upstream of the first stage blade, and the air downstream of the heat exchanger passes radially inwardly of the combustor, along an axial length of the combustor, and then radially outwardly through a hollow chamber in the vanes, and then across the blade outer air seal, to cool the blade outer air seal.

13 Claims, 3 Drawing Sheets

(51) Int. Cl.

| | | |
|---|---|---|
| *F02C 3/04* | (2006.01) | |
| *F01D 17/10* | (2006.01) | |
| *F01D 9/04* | (2006.01) | |
| *F01D 11/14* | (2006.01) | |
| *F02C 6/08* | (2006.01) | |
| *F01D 5/08* | (2006.01) | |
| *F01D 9/06* | (2006.01) | |

(52) U.S. Cl.
CPC ............ *F01D 11/14* (2013.01); *F01D 17/105* (2013.01); *F01D 17/162* (2013.01); *F02C 3/04* (2013.01); *F02C 6/08* (2013.01); F05D 2220/32 (2013.01); F05D 2240/11 (2013.01); F05D 2240/35 (2013.01); F05D 2260/213 (2013.01); F05D 2300/50212 (2013.01); Y02T 50/676 (2013.01)

(56) References Cited

U.S. PATENT DOCUMENTS

| | | |
|---|---|---|
| 4,254,618 A | 3/1981 | Elovic |
| 4,539,945 A | 9/1985 | Bosisio |
| 4,882,902 A | 11/1989 | Reigel et al. |
| 5,056,335 A | 10/1991 | Renninger et al. |
| 5,269,135 A | 12/1993 | Vermejan et al. |
| 5,305,616 A | 4/1994 | Coffinberry |
| 5,392,614 A | 2/1995 | Coffinberry |
| 5,414,992 A | 5/1995 | Glickstein |
| 5,452,573 A | 9/1995 | Glickstein et al. |
| 5,498,126 A | 3/1996 | Pigheti et al. |
| 5,724,806 A | 3/1998 | Horner |
| 5,758,485 A | 6/1998 | Frutschi |
| 5,867,979 A | 2/1999 | Newton et al. |
| 5,918,458 A | 7/1999 | Coffinberry et al. |
| 6,050,079 A | 4/2000 | Durgin et al. |
| 6,065,282 A | 5/2000 | Fukue et al. |
| 6,134,880 A | 10/2000 | Yoshinaka |
| 6,430,931 B1 | 8/2002 | Horner |
| 6,487,863 B1 | 12/2002 | Chen et al. |
| 6,612,114 B1 | 9/2003 | Klingels |
| 6,892,523 B2 | 5/2005 | Fetescu et al. |
| 7,096,673 B2 * | 8/2006 | Little ................... F01D 5/081 60/782 |
| 7,237,386 B2 | 7/2007 | Hoffmann et al. |
| 7,246,484 B2 | 7/2007 | Giffin, III et al. |
| 7,284,377 B2 | 10/2007 | Joshi et al. |
| 7,306,424 B2 | 12/2007 | Romanov et al. |
| 7,334,412 B2 | 2/2008 | Tiemann |
| 7,347,637 B2 | 3/2008 | Kubo et al. |
| 7,500,365 B2 | 3/2009 | Suciu et al. |
| 7,552,591 B2 | 6/2009 | Bart et al. |
| 7,698,884 B2 | 4/2010 | Maguire et al. |
| 7,765,788 B2 | 8/2010 | Schwarz |
| 7,823,389 B2 | 11/2010 | Seitzer et al. |
| 7,882,691 B2 | 2/2011 | Lemmers, Jr. et al. |
| 7,886,520 B2 | 2/2011 | Stretton et al. |
| 8,015,828 B2 | 9/2011 | Moniz et al. |
| 8,037,686 B2 | 10/2011 | Lasker |
| 8,087,249 B2 | 1/2012 | Ottaviano et al. |
| 8,181,443 B2 | 5/2012 | Rago |
| 8,307,662 B2 | 11/2012 | Turco |
| 8,350,398 B2 | 1/2013 | Butt |
| 8,397,487 B2 | 3/2013 | Sennoun et al. |
| 8,402,742 B2 | 3/2013 | Roberge et al. |
| 8,434,997 B2 | 5/2013 | Pinero et al. |
| 8,511,967 B2 | 8/2013 | Suciu et al. |
| 8,522,529 B2 | 9/2013 | Martinou et al. |
| 8,572,982 B2 | 11/2013 | Tiemann |
| 8,602,717 B2 | 12/2013 | Suciu et al. |
| 8,621,871 B2 | 1/2014 | McCune et al. |
| 8,727,703 B2 | 5/2014 | Laurello et al. |
| 8,776,952 B2 | 7/2014 | Schwarz et al. |
| 8,814,502 B2 | 8/2014 | Eleftheriou |
| 8,876,465 B2 | 11/2014 | Stretton |
| 8,961,108 B2 | 2/2015 | Bergmant et al. |
| 9,234,481 B2 | 1/2016 | Suciu et al. |
| 9,243,563 B2 | 1/2016 | Lo |
| 9,255,492 B2 | 2/2016 | Bacic |
| 9,297,391 B2 | 3/2016 | Rued et al. |
| 9,422,063 B2 | 8/2016 | Diaz |
| 9,429,072 B2 | 8/2016 | Diaz et al. |
| 2003/0046938 A1 | 3/2003 | Mortzheim et al. |
| 2004/0088995 A1 | 5/2004 | Reissig |
| 2005/0172612 A1 | 8/2005 | Yamanaka et al. |
| 2007/0022735 A1 | 2/2007 | Henry et al. |
| 2007/0213917 A1 | 9/2007 | Bruno et al. |
| 2007/0245738 A1 | 10/2007 | Stretton et al. |
| 2008/0028763 A1 | 2/2008 | Schwarz et al. |
| 2008/0230651 A1 | 9/2008 | Porte |
| 2008/0253881 A1 | 10/2008 | Richards |
| 2009/0007567 A1 | 1/2009 | Porte et al. |
| 2009/0074589 A1 * | 3/2009 | Fang .................... F01D 25/12 416/97 R |
| 2009/0090096 A1 | 4/2009 | Sheridan |
| 2009/0097966 A1 * | 4/2009 | McCaffrey ............ F01D 17/162 415/130 |
| 2009/0145102 A1 | 6/2009 | Roberge et al. |
| 2009/0196736 A1 | 8/2009 | Sengar et al. |
| 2009/0226297 A1 | 9/2009 | Yanagi et al. |
| 2009/0272120 A1 | 11/2009 | Tiemann |
| 2010/0043396 A1 | 2/2010 | Coffinberry |
| 2010/0154434 A1 | 6/2010 | Kubota et al. |
| 2010/0247293 A1 | 9/2010 | McCaffrey et al. |
| 2011/0036066 A1 | 2/2011 | Zhang et al. |
| 2011/0088405 A1 | 4/2011 | Turco |
| 2011/0120083 A1 | 5/2011 | Giffin et al. |
| 2011/0247344 A1 | 10/2011 | Glahn et al. |
| 2012/0067055 A1 | 3/2012 | Held |
| 2012/0102915 A1 | 5/2012 | Baltas |
| 2012/0159961 A1 | 6/2012 | Krautheim et al. |
| 2012/0180509 A1 | 7/2012 | DeFrancesco |
| 2013/0036747 A1 | 2/2013 | Fuchs et al. |
| 2013/0067928 A1 | 3/2013 | Arias Chao et al. |
| 2013/0067932 A1 * | 3/2013 | Tillman ................ F23R 3/002 60/806 |
| 2013/0098059 A1 | 4/2013 | Suciu et al. |
| 2013/0104564 A1 * | 5/2013 | Arar .................... F01D 11/24 60/782 |
| 2013/0145744 A1 | 6/2013 | Lo et al. |
| 2013/0145774 A1 | 6/2013 | Duong et al. |
| 2013/0186102 A1 | 7/2013 | Lo |
| 2013/0199156 A1 | 8/2013 | Ress, Jr. et al. |
| 2013/0239583 A1 | 9/2013 | Suciu et al. |
| 2013/0319002 A1 | 12/2013 | Sidelkovskiy et al. |
| 2014/0020506 A1 | 1/2014 | Duong |
| 2014/0137417 A1 | 5/2014 | Silberberg et al. |
| 2014/0196469 A1 | 7/2014 | Finney et al. |
| 2014/0230441 A1 * | 8/2014 | Mayer ................... F02C 7/12 60/730 |
| 2014/0230444 A1 | 8/2014 | Hao et al. |
| 2014/0250898 A1 | 9/2014 | Mackin et al. |
| 2014/0260326 A1 | 9/2014 | Schwarz et al. |
| 2014/0311157 A1 | 10/2014 | Laurello et al. |
| 2014/0341704 A1 | 11/2014 | Fletcher |
| 2014/0352315 A1 | 12/2014 | Diaz |
| 2015/0114611 A1 | 4/2015 | Morris et al. |
| 2015/0285147 A1 * | 10/2015 | Phillips ................ F01D 25/125 60/726 |
| 2015/0308339 A1 | 10/2015 | Forcier |
| 2015/0330236 A1 | 11/2015 | Beecroft et al. |
| 2015/0354465 A1 | 12/2015 | Suciu et al. |
| 2015/0354822 A1 | 12/2015 | Suciu et al. |
| 2015/0369079 A1 * | 12/2015 | McCaffrey ............ F01D 17/16 415/148 |
| 2016/0003149 A1 * | 1/2016 | Suciu ................... F02C 7/06 60/772 |
| 2016/0010554 A1 | 1/2016 | Suciu et al. |
| 2016/0010555 A1 | 1/2016 | Suciu et al. |
| 2016/0131036 A1 | 5/2016 | Bintz et al. |
| 2016/0131037 A1 | 5/2016 | Spangler et al. |
| 2016/0169118 A1 | 6/2016 | Duong |

(56) References Cited

U.S. PATENT DOCUMENTS

| | | | |
|---|---|---|---|
| 2016/0177830 A1* | 6/2016 | Guardi | F01D 5/18 60/782 |
| 2016/0201491 A1* | 7/2016 | Surace | F01D 9/065 415/1 |
| 2016/0215732 A1 | 7/2016 | Malecki | |
| 2016/0237906 A1 | 8/2016 | Suciu et al. | |
| 2016/0290157 A1* | 10/2016 | Ning | F01D 11/08 |
| 2016/0312797 A1 | 10/2016 | Suciu et al. | |
| 2016/0341125 A1 | 11/2016 | Kraft et al. | |
| 2016/0369697 A1 | 12/2016 | Schwarz et al. | |
| 2017/0009657 A1 | 1/2017 | Schwarz et al. | |
| 2017/0044980 A1 | 2/2017 | Duesler et al. | |
| 2017/0044982 A1 | 2/2017 | Duesler et al. | |
| 2017/0152765 A1 | 6/2017 | Uechi et al. | |
| 2017/0159568 A1 | 6/2017 | Sennoun et al. | |
| 2017/0167388 A1 | 6/2017 | Merry et al. | |
| 2017/0175632 A1 | 6/2017 | Hanrahan et al. | |
| 2017/0184027 A1 | 6/2017 | Moniz et al. | |
| 2017/0204736 A1* | 7/2017 | Varney | F01D 11/24 |
| 2017/0204787 A1 | 7/2017 | Duesler et al. | |
| 2018/0023475 A1* | 1/2018 | Xu | F01D 9/065 60/806 |
| 2018/0045117 A1* | 2/2018 | Groves, II | F02C 7/18 |
| 2018/0135460 A1* | 5/2018 | Barker | F01D 5/188 |

FOREIGN PATENT DOCUMENTS

| | | |
|---|---|---|
| EP | 0469825 | 2/1992 |
| EP | 0608142 | 7/1994 |
| EP | 0903484 | 3/1999 |
| EP | 1314872 | 5/2003 |
| EP | 1944475 | 7/2008 |
| EP | 2085599 | 8/2009 |
| EP | 2128023 | 12/2009 |
| EP | 2362081 | 8/2011 |
| EP | 2540991 | 1/2013 |
| EP | 2584172 | 4/2013 |
| EP | 2604825 | 6/2013 |
| EP | 2733322 | 5/2014 |
| EP | 2865981 | 4/2015 |
| EP | 2942490 | 11/2015 |
| EP | 3018288 A1 | 5/2016 |
| EP | 3075964 A1 | 10/2016 |
| EP | 3085923 | 10/2016 |
| EP | 3085924 | 10/2016 |
| EP | 3121411 | 1/2017 |
| FR | 2851295 | 8/2004 |
| GB | 1244340 | 8/1971 |
| GB | 2152148 | 7/1985 |
| JP | H1136889 | 2/1999 |
| WO | 2003037715 | 5/2003 |
| WO | 2008082335 | 7/2008 |
| WO | 2013154631 | 10/2013 |
| WO | 2014046713 | 3/2014 |
| WO | 2014092777 | 6/2014 |
| WO | 2014120125 | 8/2014 |
| WO | WO 2015020892 A1 * | 2/2015 ............... F01D 5/18 |

OTHER PUBLICATIONS

U.S. Appl. No. 15/232,101.
U.S. Appl. No. 14/964,984.
U.S. Appl. No. 14/967,446.
U.S. Appl. No. 15/069,197.
U.S. Appl. No. 15/269,014.
U.S. Appl. No. 15/373,072.
European Search Report for European Application No. 16166707.6 dated Sep. 26, 2016.
European Search Report for European Application No. 16166724.1 dated Sep. 26, 2016.
European Search Report for European Patent Application No. 16154635.3 dated Jul. 6, 2016.
European Search Report for European Application No. 16155316.9 completed Jun. 30, 2016.
European Search Report for Application No. 16170021.6 dated Oct. 11, 2016.
European Search Report for Application No. 16174862.9 dated Nov. 7, 2016.
European Search Report for European Application No. 16175531.9 dated Nov. 15, 2016.
European Search Report for European Application No. 16175533.5 dated Nov. 15, 2016.
European Search Report for European Application No. 16175552.5 dated Nov. 17, 2016.
European Search Report for European Application No. 16175760.4 dated Nov. 16, 2016.
European Search Report for Application No. 16178207.3 dated Nov. 21, 2016.
European Search Report for European Application No. 16202876.5 dated Apr. 24, 2017.
European Search Report for European Application No. 16180657.5 dated Dec. 16, 2016.
European Search Report for EP Application No. 17160816.9 dated Jul. 21, 2017.
European Search Report for EP Application No. 18166671.0 dated Aug. 2, 2018.

\* cited by examiner

COOLED COOLING AIR TO BLADE OUTER AIR SEAL PASSING THROUGH A STATIC VANE

BACKGROUND OF THE INVENTION

This application relates to the supply of high pressure cooling air to a blade outer air seal through a static vane.

Gas turbine engines are known and typically include a fan delivering air into a bypass duct for propulsion. The fan also delivers air into a compressor where air is compressed and delivered into a combustor. The air is mixed with fuel and ignited. Products of this combustion pass downstream over turbine rotors driving them to rotate. The turbine rotors, in turn, rotate compressor rotors and the fan rotor.

As can be appreciated, many components in the turbine section see very high temperatures. Two such components would be the turbine blades and blade outer air seals. Blade outer air seals typically sit radially outwardly of the blades and maintain clearance to increase the efficient use of the products of combustion.

One type of blade outer air seal is a so-called self-acting clearance control seal. In such a blade outer air seal, two components formed of different materials having different coefficients of thermal expansion to control the expansion of the blade outer air seals to, in turn, control the clearance with the blade.

Both the blade and the blade outer air seal are provided with cooling air.

Traditionally, a turbine rotated at the same speed as the fan rotor. More recently, it has been proposed to include a gear reduction between a fan drive turbine and the fan rotor. With this change, the pressures and temperatures seen across the turbine sections have increased.

To drive cooling air into the turbine, the cooling air must be at a higher pressure than in the past. The highest pressure in the gas turbine engine is that downstream of a high pressure compressor. However, this cooling air is also at relatively high temperatures.

Thus, it has been proposed to tap high pressure air from a location downstream of the high pressure compressor and pass it through a heat exchanger prior to being delivered to the turbine section for cooling.

SUMMARY OF THE INVENTION

In a featured embodiment, a gas turbine engine comprises a compressor section, a combustor, and a turbine section. The turbine section includes a high pressure turbine first stage blade having an outer tip, and a blade outer air seal positioned radially outwardly of the outer tip. A tap taps air having been compressed by the compressor, the tapped air being passed through a heat exchanger. A vane section has vanes downstream of the combustor, but upstream of the first stage blade, and the air downstream of the heat exchanger passes radially inwardly of the combustor, along an axial length of the combustor, and then radially outwardly through a hollow chamber in the vanes, and then across the blade outer air seal, to cool the blade outer air seal.

In another embodiment according to the previous embodiment, the vane section includes a plurality of vanes, with some of the vanes being static and other vanes being adjustable pitch.

In another embodiment according to any of the previous embodiments, the air passing to cool the blade outer air seal passes through the static vanes, but does not pass through the variable pitch vanes.

In another embodiment according to any of the previous embodiments, the air downstream of the heat exchanger passes into a mixing chamber where it is mixed with air from a chamber outwardly of the combustor, and then passes radially inwardly of the combustor.

In another embodiment according to any of the previous embodiments, the air from the mixing chamber also passes radially inwardly of the combustor to cool the first stage blade.

In another embodiment according to any of the previous embodiments, the mixing chamber is radially outwardly of a compressor diffuser and the air passes through vanes within the compressor diffuser.

In another embodiment according to any of the previous embodiments, the air is tapped from a location downstream of a downstream most point in a high pressure compressor section.

In another embodiment according to any of the previous embodiments, the blade outer air seal includes components of at least two different materials having two distinct coefficients of thermal expansion.

In another embodiment according to any of the previous embodiments, the air downstream of the heat exchanger passes into a mixing chamber where it is mixed with air from a chamber outwardly of the combustor, and then passes radially inwardly of the combustor.

In another embodiment according to any of the previous embodiments, the air from the mixing chamber also passes radially inwardly of the combustor to cool the first stage blade.

In another embodiment according to any of the previous embodiments, the mixing chamber is radially outwardly of a compressor diffuser and the air passes through vanes within the compressor diffuser.

In another embodiment according to any of the previous embodiments, the blade outer air seal includes components of at least two different materials having two distinct coefficients of thermal expansion.

In another embodiment according to any of the previous embodiments, the blade outer air seal includes components of at least two different materials having two distinct coefficients of thermal expansion.

In another embodiment according to any of the previous embodiments, the air downstream of the heat exchanger passes into a mixing chamber where it is mixed with air from a chamber outwardly of the combustor, and then passes radially inwardly of the combustor.

In another embodiment according to any of the previous embodiments, the vane section includes a plurality of vanes, with some of the vanes being static and other vanes being adjustable pitch.

In another embodiment according to any of the previous embodiments, the air passes to cool the blade outer air seal passes through the static vanes, but does not pass through the variable pitch vanes.

In another embodiment according to any of the previous embodiments, the air is tapped from a location downstream of a downstream most point in a high pressure compressor section.

In another embodiment according to any of the previous embodiments, the blade outer air seal includes components of at least two different materials having two distinct coefficients of thermal expansion.

In another embodiment according to any of the previous embodiments, the air downstream of the heat exchanger passes into a mixing chamber where it is mixed with air from a chamber outwardly of the combustor, and then passes radially inwardly of the combustor.

In another embodiment according to any of the previous embodiments, the air downstream of the heat exchanger passes into a mixing chamber where it is mixed with air from a chamber outwardly of the combustor, and then passes radially inwardly of the combustor.

In another embodiment according to any of the previous embodiments,

These and other features may be best understood from the following drawings and specification.

DETAILED DESCRIPTION

Figure 1:
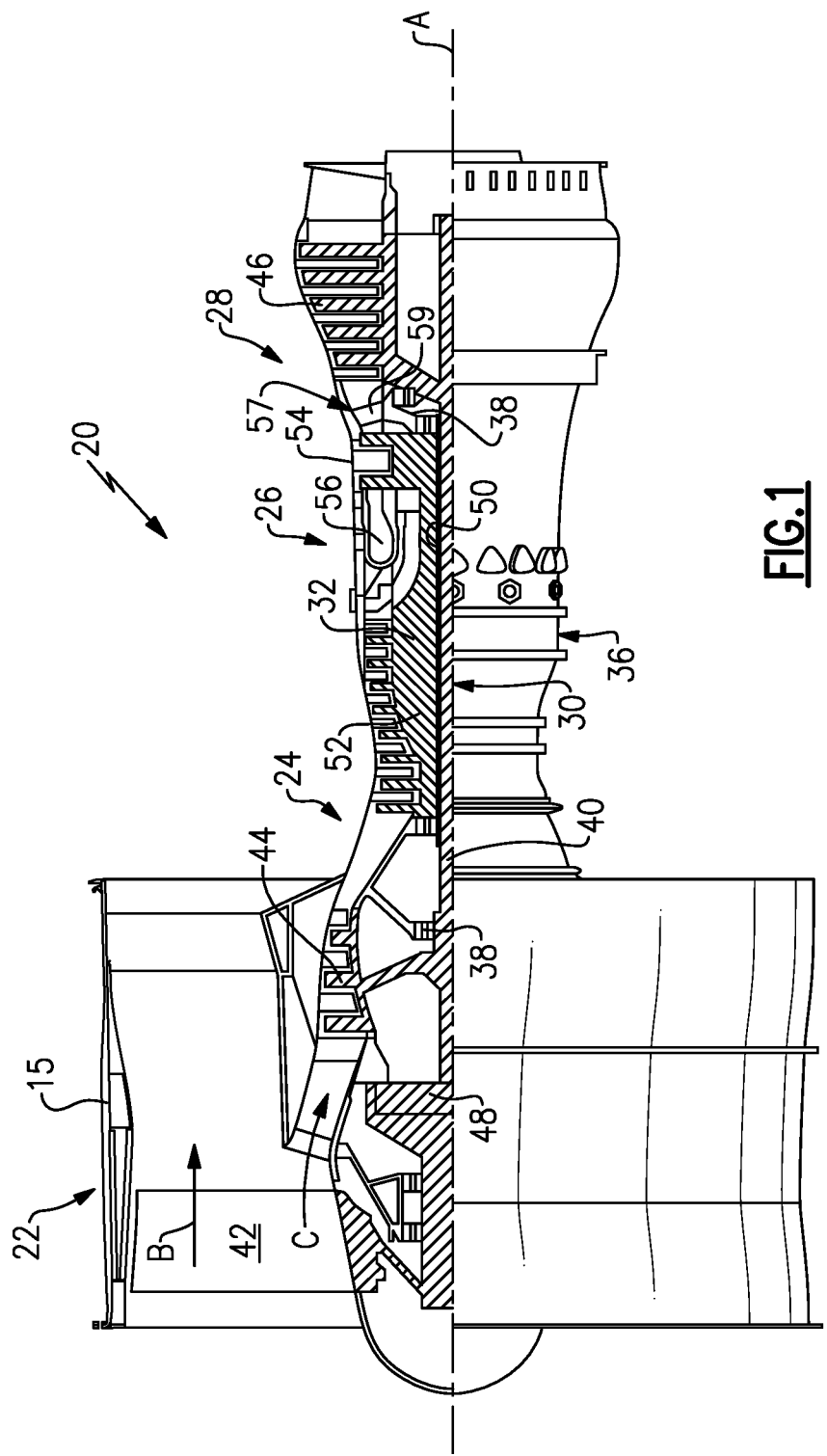
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
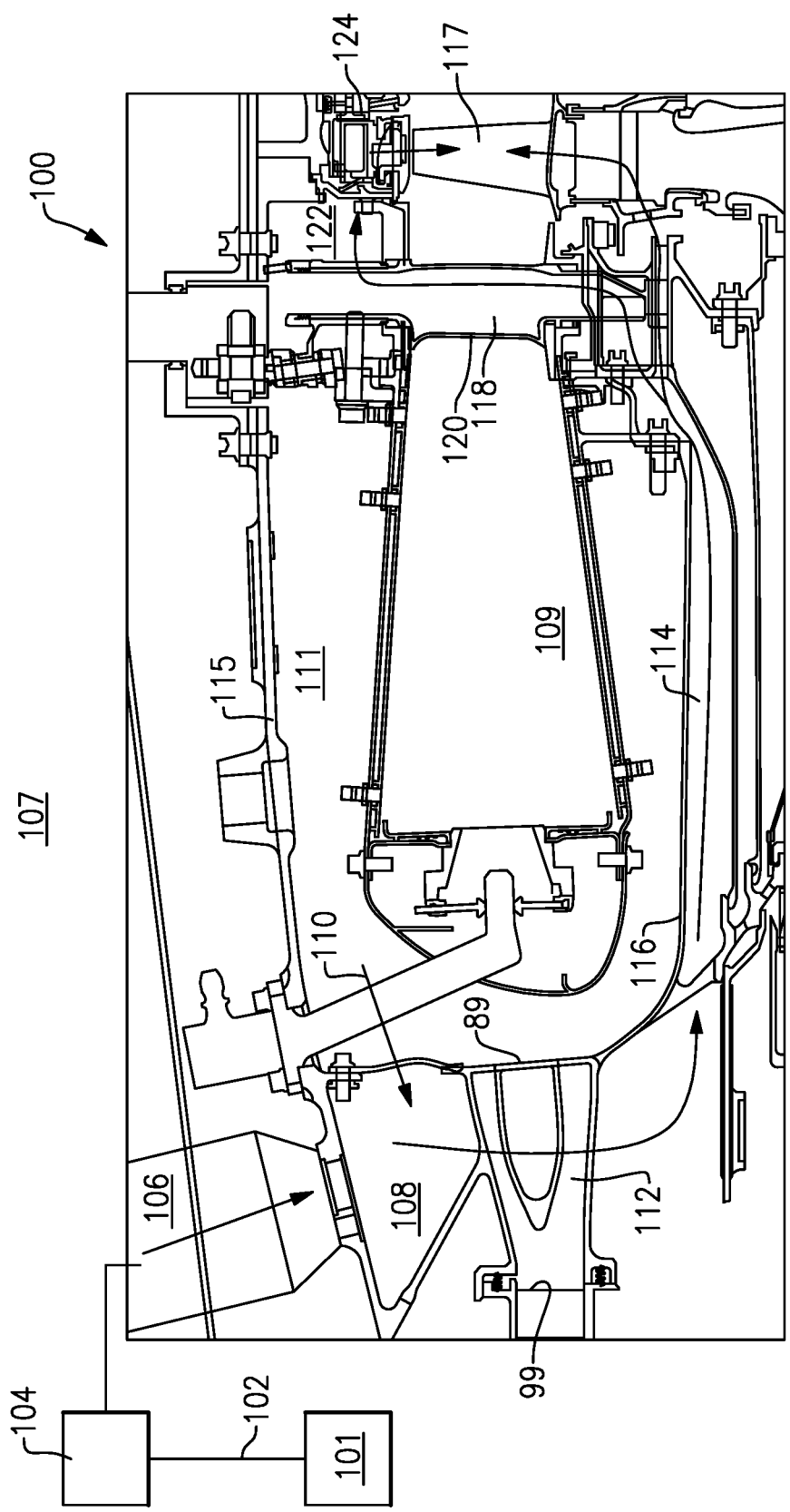
FIG. 2 shows a cooling system.

FIG. 2 shows a cooling system 100 for cooling turbine components. As shown, a compressor section 101 is provided with a tap 102 for tapping pressurized air.

The tap 102 may be at a location upstream from a downstream most portion 99 of the high pressure compressor, in which case, it is typically provided with a boost compressor to raise its pressure. Alternatively, the air can be tapped from a location downstream of location 99 where it has been fully compressed by the high pressure compressor.

In either case, pressurized air passes through a heat exchanger 104 where it is cooled, such as by air. In one embodiment, the heat exchanger 104 may be in the bypass duct as described in FIG. 1.

As shown in FIG. 2, air downstream of the heat exchanger 104 passes into one or more conduits 106 and then into a mixing chamber 108. Air at 110 from a diffuser case or chamber 111, outward of a combustor 109, passes into the mixing chamber 108 and mixes with the high pressure cooled air downstream of heat exchanger 104. In this manner, the air is raised to a pressure and temperature closer to that needed to cool the turbine section.

As known, the air in chamber 111 is downstream of the downstream most end 99 of a high pressure compressor. The chamber 111 is defined at an outward location by an outer core housing 115.

The mixing chamber 108 is radially outward of a compressor diffuser 112 and the air passes through vanes in a compressor diffuser 112 such that it is kept separate from air downstream of downstream most point 99.

The air downstream of mixing chamber 108 passes into a path 114 radially inwardly of a housing 116 and downstream to cool a turbine blade 117. This air also passes through a hollow 118 in a static vane 120 and then passes at 122 to cool a blade outer air seal 124.

The blade outer air seal may be a self-acting clearance control seal.

Figure 3:
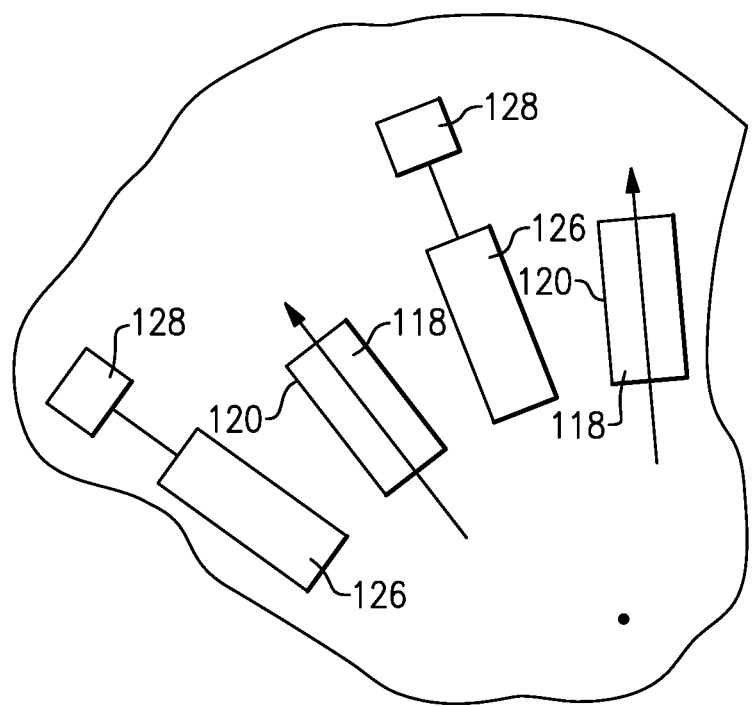
FIG. 3 shows turbine vanes associated with a gas turbine engine.

As shown in FIG. 3, the first stage vanes upstream of the first stage high pressure turbine row 117 includes static vanes 120 staggered with variable pitch vanes 126. As known, the variable pitch vanes 126 have an actuator 128 that can vary the angle dependent on the amount of flow desired across the turbine blade 117.

Of course, this disclosure will also benefit engines having only static vanes.

As can be seen, in one embodiment, the cooling air for the blade outer air seal 124 passes through the static vanes 120, but not through the variable vanes 126 in this embodiment.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a compressor section, a combustor, and a turbine section;
said turbine section including a high pressure turbine first stage blade having an outer tip, and a blade outer air seal positioned radially outwardly of said outer tip;
a tap for tapping air having been compressed by said compressor, said tapped air being passed through a heat exchanger; and
there being a vane section having vanes downstream of said combustor, but upstream of said first stage blade, and said air downstream of said heat exchanger passing radially inwardly of said combustor, along an axial length of said combustor, and then radially outwardly through a hollow chamber in said vanes, and then across said blade outer air seal, to cool said blade outer air seal;
wherein said vane section includes a plurality of vanes, with some of said vanes being static and other vanes being variable pitch; and
wherein said air passing to cool said blade outer air seal passes through said static vanes, but does not pass through said variable pitch vanes.

2. The gas turbine engine as set forth in claim 1, wherein said air downstream of said heat exchanger passes into a mixing chamber where it is mixed with air from a chamber outwardly of said combustor, and then passes radially inwardly of said combustor.

3. The gas turbine engine as set forth in claim 2, wherein said air from said mixing chamber also passing radially inwardly of said combustor to cool said first stage blade.

4. The gas turbine engine as set forth in claim 3, wherein said mixing chamber being radially outwardly of a compressor diffuser and the air passing through vanes within said compressor diffuser.

5. The gas turbine engine as set forth in claim 4, wherein said air is tapped from a location downstream of a downstream most point in a high pressure compressor section.

6. The gas turbine engine as set forth in claim 5, wherein said blade outer air seal includes components of at least two different materials having two distinct coefficients of thermal expansion.

7. The gas turbine engine as set forth in claim 4, wherein said blade outer air seal includes components of at least two different materials having two distinct coefficients of thermal expansion.

8. The gas turbine engine as set forth in claim 1, wherein said blade outer air seal includes components of at least two different materials having two distinct coefficients of thermal expansion.

9. The gas turbine engine as set forth in claim 8, wherein said air downstream of said heat exchanger passes into a mixing chamber where it is mixed with air from a chamber outwardly of said combustor, and then passes radially inwardly of said combustor.

10. The gas turbine engine as set forth in claim 1, wherein said air is tapped from a location downstream of a downstream most point in a high pressure compressor section.

11. The gas turbine engine as set forth in claim 10, wherein said blade outer air seal includes components of at least two different materials having two distinct coefficients of thermal expansion.

12. The gas turbine engine as set forth in claim 11, wherein said air downstream of said heat exchanger passes into a mixing chamber where it is mixed with air from a chamber outwardly of said combustor, and then passes radially inwardly of said combustor.

13. The gas turbine engine as set forth in claim 10, wherein said air downstream of said heat exchanger passes into a mixing chamber where it is mixed with air from a chamber outwardly of said combustor, and then passes radially inwardly of said combustor.

* * * * *